Oct. 16, 1951     T. MARTIN     2,571,372

PLASTIC VENETIAN BLIND TAPE

Filed March 1, 1948

INVENTOR.
THOMAS MARTIN
BY Harold W. Mattingly
Attorney

Patented Oct. 16, 1951

2,571,372

UNITED STATES PATENT OFFICE 2,571,372

PLASTIC VENETIAN BLIND TAPE

Thomas Martin, Riverside, Calif., assignor, by mesne assignments, to Hunter-Douglas Corporation, Riverside, Calif., a corporation of Delaware Application March 1, 1948, Serial No. 12,446

7 Claims. (Cl. 160—178)

My invention relates to Venetian blinds employing vertical tapes formed of a reinforced organic plastic material and relates particularly to reinforcing such tapes.

In United States Patent No. 2,405,579, issued August 13, 1946, to Joseph L. Hunter for Venetian Blind Tape, there is disclosed the use of a flexible plastic material, for example, a vinyl plastic, that is reinforced by threads and which is used to form the vertical tapes for the ladders of Venetian blinds. The reinforcements prevent the plastic material from stretching under load and the plastic material in turn presents a smooth surface that collects little dust and which may be readily cleaned by a wiping or other cleaning process. Also the plastic prevents dust and moisture from collecting on the threads inasmuch as the threads are preferably embedded in the plastic. The result is a superior type of Venetian blind tape or ladder that may be permanently colored according to the decorative pattern desired.

Reinforcing threads have heretofore been molded or otherwise processed directly into the finished tapes. For example, the threads have been placed between two layers of plastic material and heat and pressure have been applied to bond the layers and embed the threads. Also the threads may be stretched across a mold and a fluid plastic may be inserted in the mold to thereafter solidify and thus embed the threads. These and other processes, however, sometimes tend to deflect the threads so that they are not straight and parallel in the finished product but are crooked and distorted and thus cannot correctly perform their reinforcing function. Further, the threads have had slack or loose stretch in them, thus allowing some elongation of the plastic even under light loads.

I have discovered that the threads may be effectively maintained straight and parallel by first bonding them in a parallel array by the application of a thin film of plastic to the threads. Additionally, by stretching the threads before applying the plastic, the bonding action prevents the filaments from raveling or untwisting, thus eliminating slack. This thread retaining film may subsequently be used as a core for a finished full-sized Venetian blind tape or ladder. Accordingly the thread film may be first manufactured and stored until required for the fabrication of a Venetian blind tape or a complete ladder. Thereafter any desired thickness of plastic material may be applied to the film and the film will hold the threads substantially parallel and generally straight during this subsequent processing.

It is therefore a general object of my invention to provide an improved method of making plastic tapes that are reinforced with threads.

Another object is to provide for preliminarily aligning reinforcing threads so that they may be subsequently accurately processed in a finished plastic tape.

Another object is to provide a plastic film wherein tension threads are maintained in spaced alignment with each other by a plastic webbing so that thereafter the film may be used as a core for the application of additional plastic material.

Another object is to provide an improved Venetian blind tape of plastic material wherein reinforcing threads are maintained in parallel straight array by a film forming the core of the finished tape.

A further object of my invention is to provide a thin plastic film that bonds threads thereto in any desired orientation with respect to each other, in which film may be used as a core for a simple plastic tape or other plastic strip as desired.

Other objects and advantages of my invention will be apparent from a study of the following specifications, read in connection with the accompanying drawing, in which Fig. 1 is an elevation view of an illustrative and somewhat schematic type of apparatus that may be employed for forming the thread bonding film of my invention;

Figure 2:
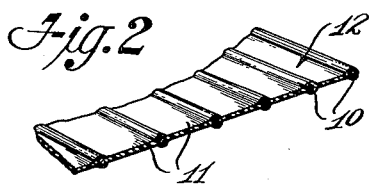
Fig. 2 is a perspective view showing a section through a portion of a thread bonding film that embodies my invention.

Referring to Fig. 2 it will be noted that a plurality of threads 10 may be spaced with respect to each other and held in any preselected arrangement, for example, parallel, by means of webbings 11 extending between them. The webbings 11 may be formed of a plastic material and the webbings and threads together form a film 12.

Figure 3:
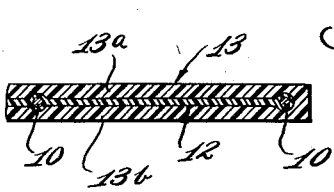
Fig. 3 is a sectional view through a portion of a finished plastic tape embodying my thread bonding film as a core.

The film 12 may be used as a core for a plastic strip or tape 13, as illustrated most clearly in Fig. 3. The film 12 accordingly forms a core upon which layers of plastic material 13a and 13b may be applied by any suitable process such as calendering, adhering by means of any adhesive or plastic solvent, molding or any other desired process.

It will be obvious to those skilled in the plastic art that various types of organic plastics could be employed. Accordingly, I do not limit myself to any particular plastic but instead include within the scope of my invention any plastic that may have suitable flexibility for use with Venetian blinds. For example, polyamide resins could be employed as either the plastic material for the film 12 or as the plastic layers 13a and 13b. Also chlorinated rubber, modified isomerized rubber, various types of natural and synthetic rubbers, ethyl cellulose, cellulose acetate, cellulose acetate butyrate and cellulose nitrate could be employed, particularly when compounded to be extremely flexible. I prefer, however, at present to employ the vinyl base resins including polyvinyl acetals, polyvinyl acetate, copolyvinyl chloride-acetate, polyvinyl chloride copolymer and polyvinyl butyral. I have found, for example, that vinyl chloride is an excellent material. Accordingly when the word "plastic" as used in this application is employed, it means an organic plastic including not only the carbon chemistry compounds but various suitable silicon compounds as well.

Figure 1:
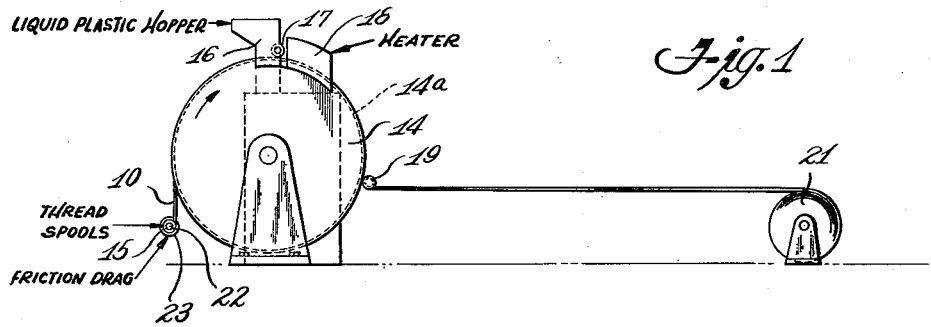

One illustrative apparatus for manufacturing the thread bonding film of Fig. 2 is illustrated in Fig. 1. The central element of this apparatus may be a rotatable drum 14, about which may be passed a plurality of the threads 10 which may originally be in the form of spools 15. The spools 15 may be mounted on a shaft 22 and a friction drag 23 may be secured to the shaft to assure tensioning of the threads. The drum 14 may be provided with a shallow peripheral trough 14a if desired, having a width and depth substantially that desired for the finished film 12. Further, the trough may be provided with grooves for receiving each thread in an individual groove. The threads 10 may pass upwardly over the drum from their spools 15 and an upper surface of the drum 14 may pass beneath and closely to the outlet of a stationary hopper 16 containing a suitable plastic in liquid form. The plastic will flow over the surface of the drum 14 including the trough 14a and will thoroughly wet, impregnate and cover the threads 10. A squeegee roller 17 may be employed if desired to limit the amount of liquid plastic that is carried forward by the drum so that the films 12 will be of uniform thickness. A heater 18 may be provided posterior to the hopper 16 with respect to the direction of rotation of the drum and will act as a solidifying or polymerizing agent for the liquid plastic. The solidified film with the threads bonded therein may be passed under an idler pulley 19 to be coiled upon a storage reel 21. The threads 10 may be maintained under tension by the friction drag 23 so that they will be straight and parallel and so that all slack is taken up.

The liquid plastic may be in any suitable form and, for example, may be a polymerized plastic in solution or could be a monomer mixed with any suitable plasticizer. While various types of plastic material may be used as noted, I have found that a vinyl chloride dissolved in suitable ketones or esters may be employed, the heater 18 acting to vaporize the solvent material to leave the film interconnecting the threads. I do not, however, limit myself to any particular type of plastic and instead comprehend the use of any suitable liquid plastic that may be readily solidified by heating or any other suitable solidifying or polymerizing process.

Figure 4:
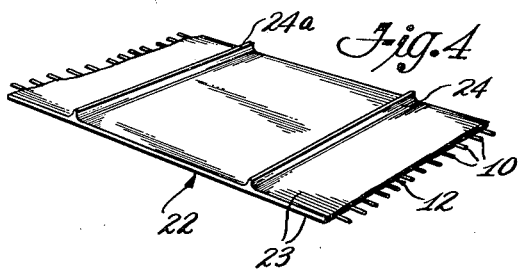
Fig. 4 is a perspective view of a modified form of a finished Venetian blind tape having integrally formed thereon cross bar stubs of full width.
Figure 6:
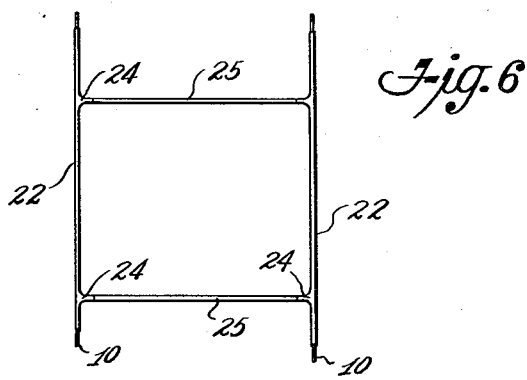
Fig. 6 is an elevation view of a fragmentary portion of a Venetian blind ladder wherein a pair of tapes embodying my invention may be joined by cross bars.

Illustrated in Fig. 4 is a modified form of a finished Venetian blind tape employing my central film 12 as a core. A strip 22 may employ a core 12 and may have bonded on either side thereof plastic sheets 23. One side of the strip 22 may be provided with transverse ridges 24 preferably extending entirely across the width of the strip. It will be noted that these ridges 24 have a broad base and have a rounded or filleted cross section that terminates in a flat narrow top 24a. These ridges 24 are intended for use as cross web stubs or anchors for the cross webs of a completed Venetian blind ladder such as that illustrated in Fig. 6. There it will be noted that the ridges or stubs 24 may be provided on two oppositely facing strips 22 and that a cross web 25 may be secured to the outer ends of opposite stubs 24 to form a typical ladder structure.

The strip material of Fig. 4 may be formed in various fashions and, for example, the top and bottom layers 23 may be heat welded to the thread film 12. Thereafter the ridges or stubs 24 may be heat welded to one side of the strip. This heating may be done by radiant type of heaters, by hot metal applying tools or molds or the heat may be formed by a high frequency dielectric field or any other suitable heating mechanism. This heat welding is particularly effective on vinyl materials inasmuch as they readily fuse together at approximately 200° F. The stubs 24 as well as the layers 23 could, however, if desired, be molded to the thread film 12 by a mold contoured to give a final shape desired such as that illustrated.

Figure 5:
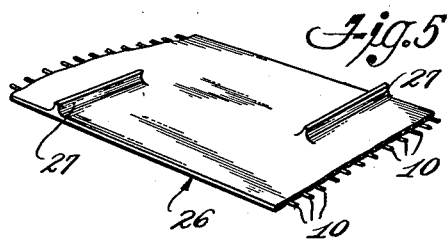
Fig. 5 is a perspective view of a second modified form of my invention wherein a finished Venetian blind tape may have cross bar stubs of partial width which may be staggered.

Illustrated in Fig. 5 is a second modified form of Venetian blind tape designated generally by the numeral 26. This strip may have cross bar stubs 27 formed thereon but unlike those of Fig. 4 the ridges or stubs extend only about part way across. A length of strip 26 accordingly would contain an alternating series of stubs 27 that are staggered so that fractional width cross webs could be employed as in the conventional type of Venetian blinds employing a fabric type of ladders. Thus the stubs 27 may be of less than half width so as to permit a raising cord to pass between the inner ends of the two stubs in accordance with the conventional practice. This is in contrast to the tape of Fig. 4 wherein the cross webs extend the entire width of the tapes and accordingly the raising cords may be disposed out of the line of the bars or the cross bars may be centrally apertured to receive a raising cord. The tape of Fig. 5 may be formed in the same manner as the tape of Fig. 4.

While I have described my invention with respect to particular shapes that are presently preferred, I do not limit myself to these or other shapes or structures. While the thread films may be of any desired width containing any selected number of threads, I have found that a film 1½ inches wide containing 12 evenly spaced threads has proved quite satisfactory. The film may be several thousands of an inch thick; for example, 3 to 10 thousandths of an inch, and the finished tape (Fig. 3) may be $\frac{1}{32}$ of an inch thick. The threads may be of any suitable fabric material such as cotton, linen, synthetic material such as rayon or spun glass. In general, I prefer to have the thickness of the specific webbing 11 extending between adjacent threads approximately half the diameter of the threads 10. However, they may be reduced below this thickness, the only requirement being that there be sufficient strength to maintain the threads 10 in the selected parallel array while being processed by the application of additional plastic to one or both sides.

Also, it will be obvious that the thickness of the webbing 11 may be greatly in excess of the thickness of the threads 10 without departing from the teaching of the invention or the advantages obtained by the invention. Also, while I have described additional plastic material as being applied to both sides of the film 12, it will be appreciated that the added plastic may be disposed on one side only. In this event, however, care should be taken that the threads 10 are thoroughly embedded within the plastic so that they will be moisture-resistant as well as dust-resistant. Pretensioning is not necessary in the sense that the threads are elastically stretched, but rather, tensioning sufficient to remove slack may be provided to insure that all of the threads will be straight and substantially under uniform tautness.

Also the initial film could be provided utilizing a fabric tape similarly impregnated or coated while the fabric tape is under longitudinal tension. Fabrics that are commercially available at present, however, result in a material that is too stiff for satisfactory Venetian blind operations and for this reason I have illustrated the invention as applied to a plurality of individual parallel threads 10. The plastic webs 11 in the film 12 serve the same function as cross threads in weaving insofar as maintaining the alignment of the reinforcing threads 10. Further, it will be appreciated that the thin film 12 may be formed by heat welding a thin plastic film to aligned threads 10.

In view of the foregoing, it will be obvious that the disclosure is merely illustrative and not definitive or limiting of my invention and that I comprehend as coming within the true spirit and scope of the invention all such modifications as may be made by those skilled in the art.

I claim:

1. A tape for a Venetian blind ladder comprising a strip of flaccid material having transversely-extending spaced stubs extending from one side thereof to which a cross bar is adapted to be attached.

2. A tape for a Venetian blind ladder comprising a strip of flaccid resinous material having integrally-formed, transversely-extending, spaced stubs extending from one side thereof to which cross bars are adapted to be attached.

3. A tape for a Venetian blind ladder as defined in claim 2 made of a plasticized vinyl resin.

4. A tape for a Venetian blind ladder comprising a core including a single layer of relatively widely spaced, substantially parallel threads, a film of plastic material having said threads embedded in one surface thereof and binding the threads into a unitary structure, the film of plastic material having a thickness not substantially greater than the diameter of the threads, a layer of plastic material bonded to the side of said film in which the spaced threads are embedded, said layer of plastic material being at least of sufficient thickness to extend outwardly beyond the threads and having a planar outer surface, and transversely-extending cross-bar stubs on the outer planar surface of said layer of plastic material.

5. A tape for a Venetian blind ladder as set forth in claim 4 in which a second layer of plastic material is secured to the other side of said film.

6. A tape for a Venetian blind ladder as set forth in claim 1 in which the cross-bar stubs are of less than half the width of the tape and have an alternating staggered arrangement.

7. A tape for a Venetian blind ladder as set forth in claim 1 in which the cross-bar stubs extend transversely across the tape approximately the full width thereof.

THOMAS MARTIN.

REFERENCES CITED

The following references are of record in the file of this patent:

UNITED STATES PATENTS

| Number | Name | Date |
| --- | --- | --- |
| 271,493 | McClelland | Jan. 30, 1883 |
| 1,297,643 | Boyer | Mar. 18, 1919 |
| 1,509,365 | Midgley | Sept. 23, 1924 |
| 1,518,513 | Howard | Dec. 9, 1924 |
| 1,610,373 | Hardman | Dec. 14, 1926 |
| 1,610,776 | Hardman | Dec. 14, 1926 |
| 1,905,392 | Freydberg | Apr. 25, 1933 |
| 2,107,067 | Alderfer | Feb. 1, 1938 |
| 2,344,457 | Christ | Mar. 14, 1944 |
| 2,405,579 | Hunter | Aug. 13, 1946 |
| 2,407,548 | Goldman | Sept. 10, 1946 |
| 2,512,762 | Benson et al. | June 27, 1950 |
| 2,535,926 | Hunter et al. | Dec. 26, 1950 |